(No Model.)
L. B. McEWEN.
LOG SKIDDER.
No. 548,135. Patented Oct. 15, 1895.
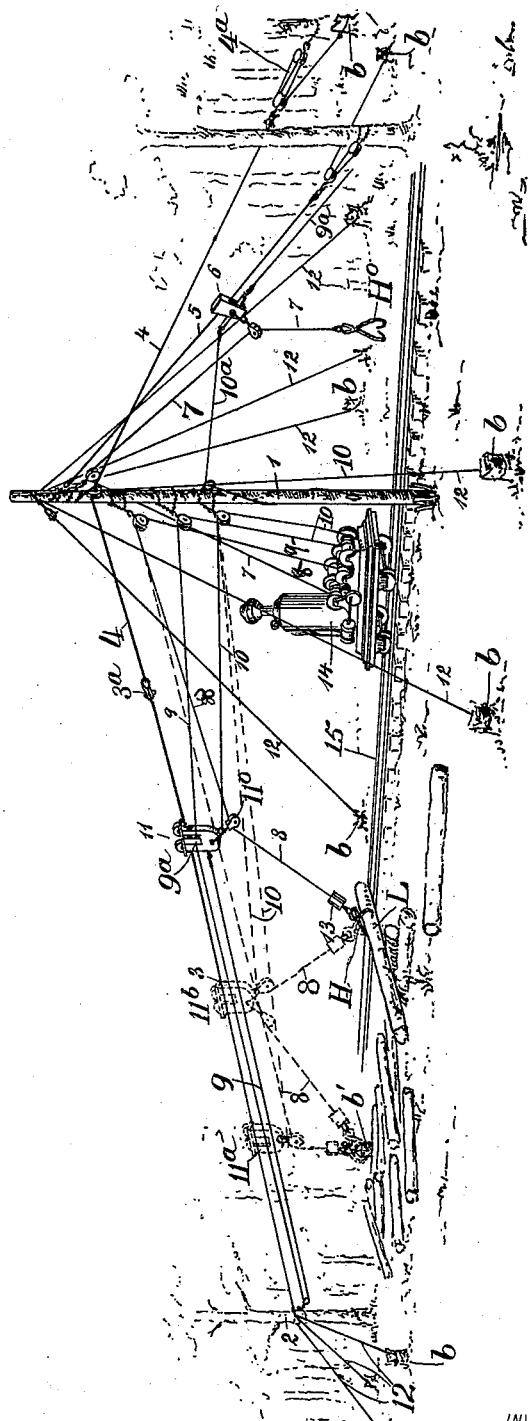
WITNESSES:
Harry Graham
Percy C. Bowen
INVENTOR
L. B. Mc. Ewen.
BY Whitman & Wilkinson
ATTORNEYS

UNITED STATES PATENT OFFICE.

LUCIUS B. McEWEN, OF NEW ORLEANS, LOUISIANA.

LOG-SKIDDER.

SPECIFICATION forming part of Letters Patent No. 548,135, dated October 15, 1895.

Application filed August 17, 1895. Serial No. 559,655. (No model.)

*To all whom it may concern:*

Be it known that I, LUCIUS B. MCEWEN, a citizen of the United States, residing at New Orleans, in the parish of Orleans and State of Louisiana, have invented certain new and useful Improvements in Log-Skidders; and I do hereby declare the following to be a full, clear, and exact description of the invention, such as will enable others skilled in the art to which it appertains to make and use the same.

My invention relates to improvements in log-skidders; and it consists in certain improvements whereby the log may be more expeditiously handled and at a less expense for manual labor than in the apparatus hitherto ordinarily used for this purpose.

The said invention will be understood by reference to the accompanying drawing, which represents a perspective view of the entire apparatus in operation.

1 represents the main spar-tree, to which are secured a number of pulley-blocks, either by chain slings, as shown, or in any other convenient way. This spar-tree is stayed in place by a plurality of stays 12, secured at their lower end to convenient stumps $b$.

3 represents a supporting wire rope or cable on which runs the bicycle 11, from which the log is supported. The lower end of this cable 3 is secured to a convenient tree or stump 2, which may be stayed in the same way as the mast 1, if necessary. The upper end of this cable 3 is secured, as at $3^a$, to the rope or cable 4, which passes over a sheave or block on the mast 1, and is set up at its outer end by means of a block and tackle $4^a$.

The bicycle 11 is drawn along the wire rope or cable 3 by means of an outhaul 9, which is secured at its fixed end to the bicycle 11, then passes through a pulley on the support 2 and through a fair-leader $9^a$ on the bicycle 11, whence it is led through a pulley secured to the main tree-spar 1 down to one of the drums operated by the engine 14. This outhaul, it will be seen, pulls the bicycle away from the spar 1, while motion in the opposite direction is obtained by means of the inhaul 10, which also passes through a block or pulley on the spar 1 and leads down to a drum operated by the engine. By means of this outhaul and inhaul the bicycle may be moved to any desired position on the cable 3. When the log is hooked on, as by means of the hooks H, to the skidding-wire 8, the act of winding up the wire 8 on its corresponding drum will also tend to bring the bicycle toward the spar 1, and thus in handling the logs the combined effect of the inward drag on the skidding-wire 8 and on the inhaul 10 is obtained.

The effect of being able to adjust the position of the bicycle by means not only of an outhaul, but of an inhaul, is not only to save time and labor in adjusting exactly the position of the bicycle, but also obviates the tedious and expensive practice of overhauling the skidding-wire 8 by hand, as is now ordinarily practiced. Thus suppose it be desired to skid the log L. The bicycle would be run out by means of the outhaul 9 until the tongs H were near some suitable stump, as $b'$, at some distance beyond the log L. The bicycle would then be somewhat beyond the position indicated by $11^a$. Then pull in on the rope 10 and the tongs will drop. Then hook the tongs in this stump $b'$ and run back the bicycle by means of the inhaul until it reaches a position such as is indicated in dotted lines at $11^b$, when there would be plenty of slack of the skidding-wire 8 to enable the tongs to be readily hooked into the log L without rendering it necessary to overhaul the said rope by hand. In this way nearly all the work of manipulating the tongs is done from the engine, and the only attendance required at the tongs is for the purpose of lifting the same or dragging the same for short distances, which is very much less than the operation of overhauling the wire 8 by hand, as is now ordinarily practiced.

The tongs are kept below the block $11^0$ by means of a rubber stop 13, secured on the wire 8 above the said tongs.

After the log is skidded to the proper position by means of the wire 8 it is hoisted onto the car or boat (not shown) by means of the apparatus shown on the right of the figure, where a similar supporting rope or cable 5, with traveler or bicycle 6 thereon, is provided on the opposite side of the spar-tree 1 from the rope 3 for picking up the logs dropped from the tongs H at the end of the skidding-wire 8. With this second device for lifting the logs the traveler or bicycle 6 is pulled outward by means of the outhaul $9^a$ and is pulled inward by means of the inhaul $10^a$, both operated by hand, in order to place the bicycle at a convenient pivot for loading. With this auxiliary device the log is caught by the tongs $H^0$ and is pulled upward and inward by loading-wire 7, which is wound on a drum operated by the engine 14.

The engine-truck runs on the track 15 and carries a plurality of drums operated by engine 14, or the engine, drums, &c., may be carried by a boat or sled.

It will be obvious that various other modifications of the herein-described apparatus might be made which could be used without departing from the spirit of my invention.

Having thus described my invention, what I claim, and desire to secure by Letters Patent of the United States, is—

An apparatus for skidding logs, comprising an overhead cable, a bicycle traveling on said cable and projecting downward beneath the same, drums and means for revolving the same, an outhaul connected to said bicycle and operated by one of said drums, an inhaul connected to said bicycle and operated by another of said drums, and a hoisting rope passing over a sheave carried by said bicycle and leading to third drum, and tongs, and a cushioning stop secured to said rope above said tongs, substantially as described.

In testimony whereof I affix my signature in presence of two witnesses.

LUCIUS B. McEWEN.

Witnesses:
HARRY Y. DAVIS,
JOHN H. HOLT.